United States Patent
Sandor et al.

(10) Patent No.: US 6,241,111 B1
(45) Date of Patent: *Jun. 5, 2001

(54) CONTAINER NECK FINISH AND METHOD AND APPARATUS FOR FORMING SAME AND CAP FOR USE THEREON

(75) Inventors: Laszlo Sandor, Fremont; Daniel Luch, Morgan Hill; Richard E. Repp, San Jose, all of CA (US)

(73) Assignee: Portola Packaging, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/365,432

(22) Filed: Aug. 2, 1999

Related U.S. Application Data (63) Continuation-in-part of application No. 08/894,189, filed on Jul. 29, 1997, now Pat. No. 6,003,699, which is a continuation-in-part of application No. 08/385,808, filed on Feb. 9, 1995, now abandoned, application No. 08/847,928, filed on Apr. 28, 1997, now Pat. No. 5,964,362, which is a continuation-in-part of application No. 08/385,808, filed on Feb. 9, 1995, now abandoned.

(51) Int. Cl.$^7$ ............................ B65D 41/34; B29C 49/50; B29C 25/00

(52) U.S. Cl. ............................ 215/43; 215/45; 215/252; 215/344; 264/536; 425/527

(58) Field of Search ........................ 215/43–45, 256, 215/252, 343, 344, 354; 206/508, 309; 264/533, 536, 531, 163; 425/525, 527, 289, 292, 296, 298, 308, 310

(56) References Cited

U.S. PATENT DOCUMENTS

| | | |
|---|---|---|
| 3,343,698 | 9/1967 | Anderson et al. . |
| 3,572,413 | 3/1971 | Livingstone . |
| 3,592,349 | 7/1971 | Baugh . |
| 3,784,038 | 1/1974 | Uhlig . |
| 3,940,004 | 2/1976 | Faulstich . |
| 4,037,748 | 7/1977 | Stubbs, Jr. . |
| 4,187,070 | 2/1980 | Martin . |
| 4,202,455 | 5/1980 | Faulstich . |
| 4,225,303 * | 9/1980 | Crisci .................................. 425/525 |
| 4,305,517 | 12/1981 | Dennis . |
| 4,402,451 | 9/1983 | Woerz et al. . |
| 4,496,066 | 1/1985 | Bullock . |
| 4,699,285 | 10/1987 | Perne et al. . |
| 4,699,286 | 10/1987 | Nolan . |
| 4,699,287 | 10/1987 | Bullock . |
| 4,823,967 | 4/1989 | Thompson . |
| 4,844,268 | 7/1989 | Bullock, III . |
| 4,903,849 | 2/1990 | Wallman . |

(List continued on next page.)

FOREIGN PATENT DOCUMENTS

| | | |
|---|---|---|
| 2205105 | 8/1972 | (DE) . |
| 2 103 990 | 3/1983 | (GB) . |

Primary Examiner—Nathan J. Newhouse
(74) Attorney, Agent, or Firm—Flehr Hohbach Test Albritton & Herbert LLP (57) ABSTRACT

The neck of a container has a smooth seal surface engaged by the inner skirt or plug of a cap. Such surface is free of trim and parting line flaws which are characteristic of blow-molded jars because the surface is formed in such a way that the seal surface is not in contact with mold parting lines and further the trim (excess plastic) of the neck is located away from the sealing surface. In one form of the disclosure, above the sealing surface the neck wall slants outward and then bends upward-inward in a short, tapered stretch which engages the underside of the cap disk to compress against the disk or a liner or foil. Other forms of seal surfaces are disclosed. The exterior of the neck is formed with screw threads which engage threads on the interior of the outer skirt of the cap. Caps suitable for combination with the neck, methods of forming the neck and mold apparatus for forming the neck are also disclosed.

23 Claims, 10 Drawing Sheets

U.S. PATENT DOCUMENTS

| | | |
|---|---|---|
| 5,256,055 | 10/1993 | Morris . |
| 5,308,574 * | 5/1994 | Yamazaki et al. . |
| 5,373,955 | 12/1994 | Marino . |
| 5,593,055 * | 1/1997 | Repp et al. ............................ 215/256 |
| 5,964,362 * | 10/1999 | Sandor et al. ...................... 215/45 X |
| 5,967,352 * | 10/1999 | Repp et al. ........................... 215/256 |
| 5,975,320 | 11/1999 | Bietzer et al. . |
| 5,975,321 * | 11/1999 | Luch .................................... 215/256 |
| 6,003,699 * | 12/1999 | Laszlo et al. ...................... 215/45 X |

* cited by examiner

CONTAINER NECK FINISH AND METHOD AND APPARATUS FOR FORMING SAME AND CAP FOR USE THEREON

CROSS REFERENCE TO RELATED APPLICATIONS

This application is a continuation-in-part of U.S. patent application No. 08/894,189 filed Jul. 29, 1997, now U.S. Pat. No. 6,003,699, which is a continuation-in-part of U.S. patent application Ser. No. 08/385,808 filed Feb. 9, 1995, now abandoned. This application is also a continuation-in-part of U.S. patent application Ser. No. 08/847,928, filed Apr. 28, 1997 now U.S. Pat. No. 5,964,362, which is a continuation of U.S. patent application Ser. No. 08/385,808 filed Feb. 9, 1995, now abandoned.

BACKGROUND OF THE INVENTION

1. Field of the Invention

This invention relates to a new and improved blow molded neck construction for a bottle or other container, a cap therefor, a method of forming said neck and molds for forming said neck. More particularly, it relates to the neck finish for a blow molded plastic bottle characterized by the fact that when used with a cap having a plug (i.e., inner skirt) the surface of the neck against which the plug seals is a seal surface without parting lines and no portion has a diameter less than that of the seal surface. Hence, the plug seals against a smooth surface and leakage is prevented.

2. Description of Related Art

An exemplar of the prior art is U.S. Pat. No. 4,691,834 which shows an upward inward directed flexible flange sealing against the corner of the intersection of the outer wall of the plug and the underside of the top of the cap. The neck sealing surface is, inherently, somewhat uneven and ragged since the neck is cut or sheared adjacent this sealing surface. In the present invention, however, the neck is trimmed on the edge above the seal surface but such edge is not the portion of the neck which seals against the cap plug.

The references cited against said U.S. Pat. No. 4,691,834 are likewise distinguishable.

U.S. Pat. Nos. 4,625,876 and 4,798,301 show curved plug contacting surfaces but these are of substantially the same diameters as the inner edge of the flanges which engage the underside of the top of the cap.

SUMMARY OF THE INVENTION

The bottle of the present invention is blow molded in a split mold by techniques well known in the art. The surfaces of the mold which define the neck structure cause the neck shape hereinafter described. An upper portion of the parison above the neck is trimmed or cut from the neck according to conventional practice (e.g. pull-up trim, spin trim, ram-down, etc.). In one neck structure the circle at which the upper portion of the parison is severed from the neck is the inner edge of an inward-upward slanted flange. The other end of the flange merges into a curved surface which extends inward a greater distance than the aforesaid edge to merge with an internal sealing surface of lesser diameter than said edge. The neck structure above the neck sealing surface may have rapidly changing diameters which form a flexible membrane due to parison stretching in the blow molding process. In one form of the invention, below the sealing surface the exterior of the neck structure slants downward-outward to a horizontal shoulder and then extends downwardly and then outwardly to a second or lower shoulder. Other cap engaging means may be used. Most of the modifications of the invention shown in U.S. application Ser. No. 08/385,808 disclose neck finishes and caps of the "snap-on" variety. In accordance with the present invention, however, screw caps wherein the neck and cap skirt have complementary threads are illustrated. The fact that the same upper neck structure may be used either with a snap-on or a screw-on cap thus becomes apparent.

A cap with which the neck is used has a top having a depending central plug or inner skirt, the outer surface of which seals tightly against the sealing surface of the neck. The cap also has an outer skirt having internal sealing beads which engage the upper and lower shoulders of the neck to hold the cap in place. Alternatively, the neck may have threads which are engaged by threads on the cap skirt. The lower portion of the outer cap skirt may be removed by the user engaging and pulling a pull tab which causes the lower part of the skirt to disengage at a circumferential score line. Until such lower skirt is removed, the cap and neck are tamper-evident. Other types of neck engaging means may be employed.

Several different ways may be employed to form the neck finishes of the present invention in blow molding operations. One such means employs a conventional blow mold wherein a blow dome is formed above the neck finish with several abrupt bends in the parison between the blow dome and the neck sealing surface. The blow dome is trimmed from the neck in a conventional trimming operation.

In another modification of the invention, the shear steel located above the neck finish insert has a projecting extension which is engaged by an outward projection on the blow pin so that when the blow pin is withdrawn, the two extensions shear the parison above the sealing surface of the neck.

In still another form of the invention, the shear steel is formed with an outward projection and the blow pin is formed with an outward projection below the level of the shear steel. When the blow pin is raised, the two projections shear the excess parison. In this form of the invention the neck finish is approximately vertical.

The accompanying drawings, which are incorporated in and form a part of this specification, illustrate embodiments of the invention and, together with the description, serve to explain the principles of the invention:

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
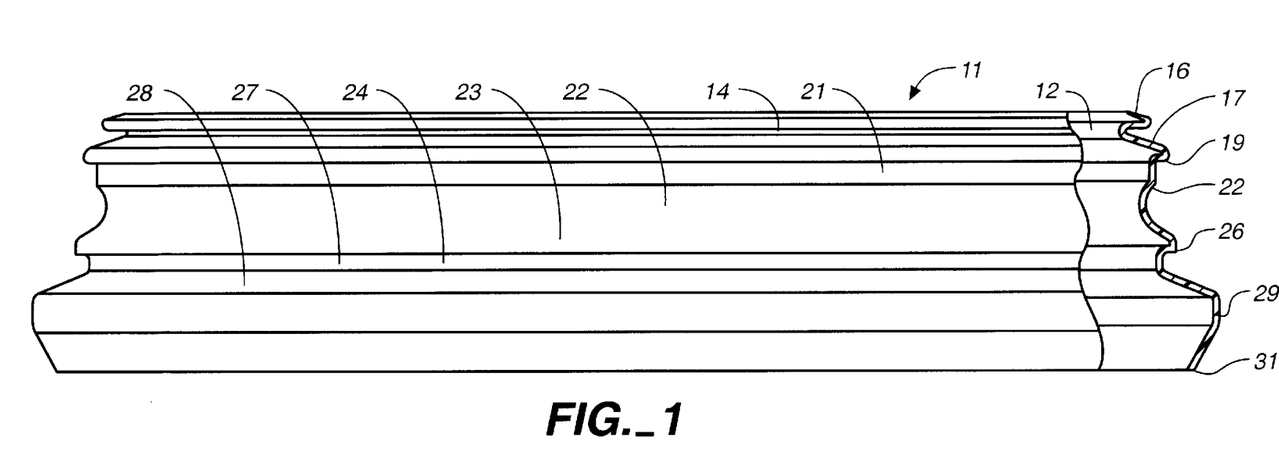
FIG. 1 is a side elevational view of a neck portion of a jar in accordance with the present invention partially broken away to reveal structure.
Figure 2:
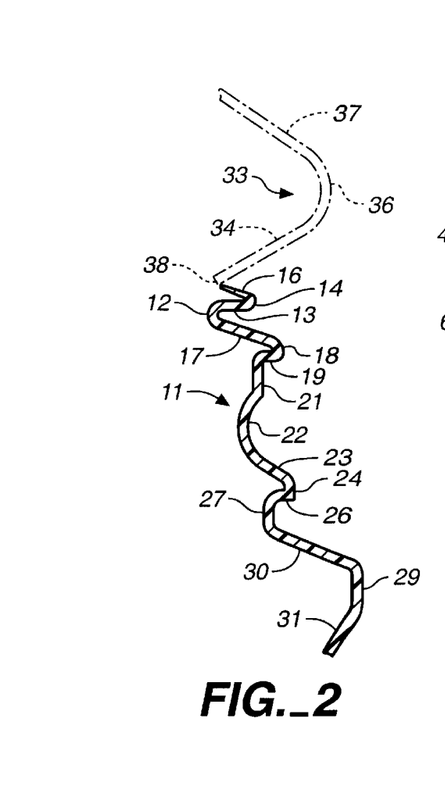
FIG. 2 is an enlarged sectional view of the neck structure and a portion of a blow dome superimposed thereabove.
Figure 3:
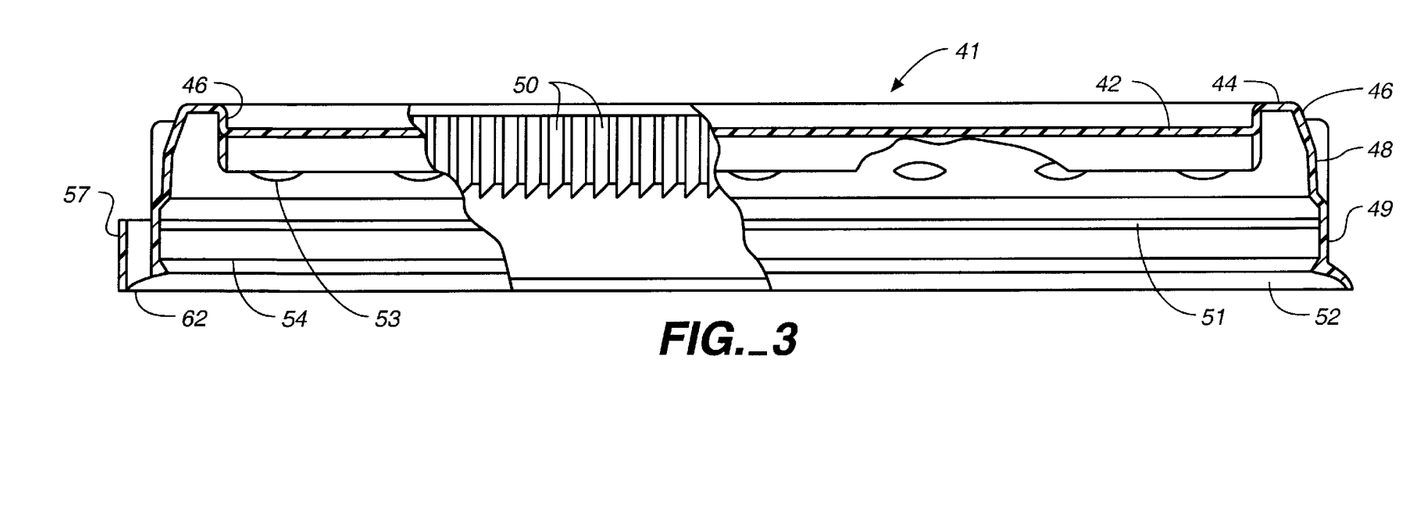
FIG. 3 is a side elevational view of a snap-on type cap with which the neck of FIG. 1 is used, the cap being partially broken away in section to reveal internal construction.
Figure 4:
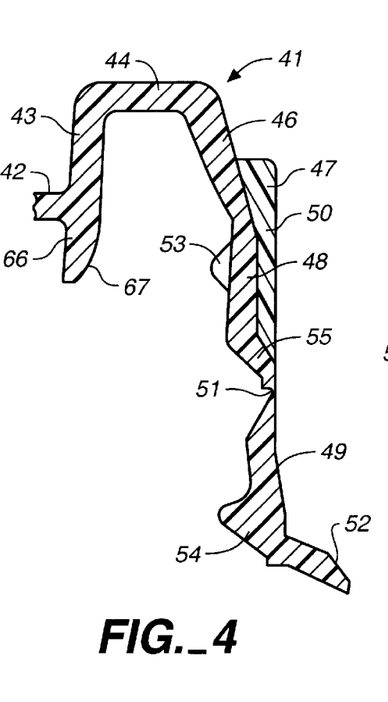
FIG. 4 is an enlarged sectional view of a portion of FIG. 3.
Figure 12:
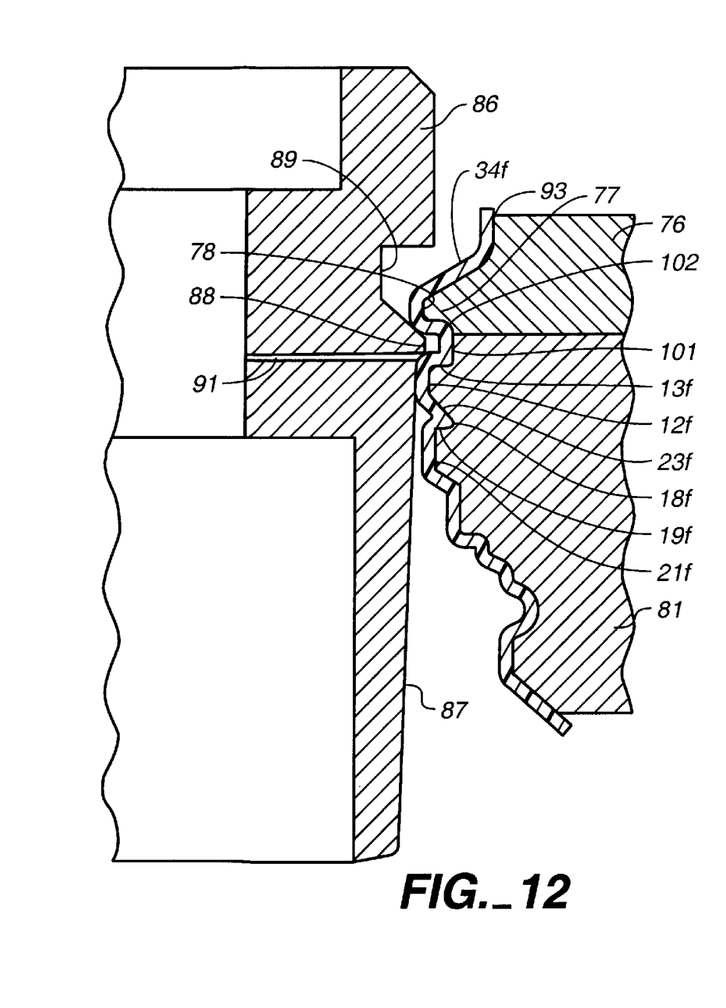
FIG. 12 is a vertical sectional view through a modified container neck and portions of the mold and blow pin forming same.

As shown in FIGS. 1–7, neck 11 is formed on a thin-walled jar or other container and has a curved primary seal surface 12 which is very smooth and is distinguished by the absence of parting lines inasmuch as it is formed by air pressure or other mechanical means during the blow molding process and is not formed by the mold halves and thus does not have a mold parting line formed therein. As shown in FIG. 12, seal surface 12 may be vertical or it may be curved, as shown in FIG. 2. Further, the primary sealing surface has minimal ovality, by reason of the way it is formed. Above surface 12 the neck structure extends outwardly in a outward stretch 13 which terminates in an upward bend 14. Above bend 14 is a thin, tapered upward-inward extending flange 16, the inner edge of which is of greater diameter than the diameter of surface 12. Below surface 12 the neck extends downwardly-outwardly in a slanted stretch 17 which terminates in a short vertical stretch 18, there being an inward directed substantially horizontal upper shoulder 19 below surface 18. Vertical stretch 21 extends downwardly from the inner edge of shoulder 19 terminating in an inwardly curved portion 22 which merges with an outward-downward stretch 23. An approximately vertical short surface 24 (of greater diameter than surface 18) terminates in a second or lower horizontal inward directed shoulder 26. Vertical stretch 27 depends from the inner edge of shoulder 26, merging with an outward stretch 30 which merges with an outward-downward stretch 29. The lower end of stretch 29 merges with an inward-downward stretch 31.

In accordance with one form of standard blow molding practice, a parison of the plastic material from which the container is to be formed is deposited in the split mold. Air is blown into the parison to expand it to fill the mold. In this form of the present invention, the mold has an insert which shapes the finish of the neck of the container heretofore described and above the neck insert the mold widens out to establish what is known as a blow dome of excess material. The blow dome is severed from the neck finish by well-known means. In accordance with one form of the present invention, as distinguished from prior neck finishes, the blow mold is severed at the inner edge of flange 16, as by trimming. Severing the edge of the neck from the blow dome may cause a rough surface. One of the advantages of the present invention is that the edge at which the blow dome is severed is not the primary sealing surface 12. Thus, directing attention to FIG. 2, blow dome 33 has an outward-upward slanted stretch 34 merging into a curved stretch 36 which has an inward slanted stretch 37. The cut line 38 is a circle wherein the stretch 34 is severed from the inner edge of flange 16. By reason of the almost 180° bend 14 and the rapid diameter changes within a relatively short vertical distance flange, 16 is thin and flexible.

Figure 13:
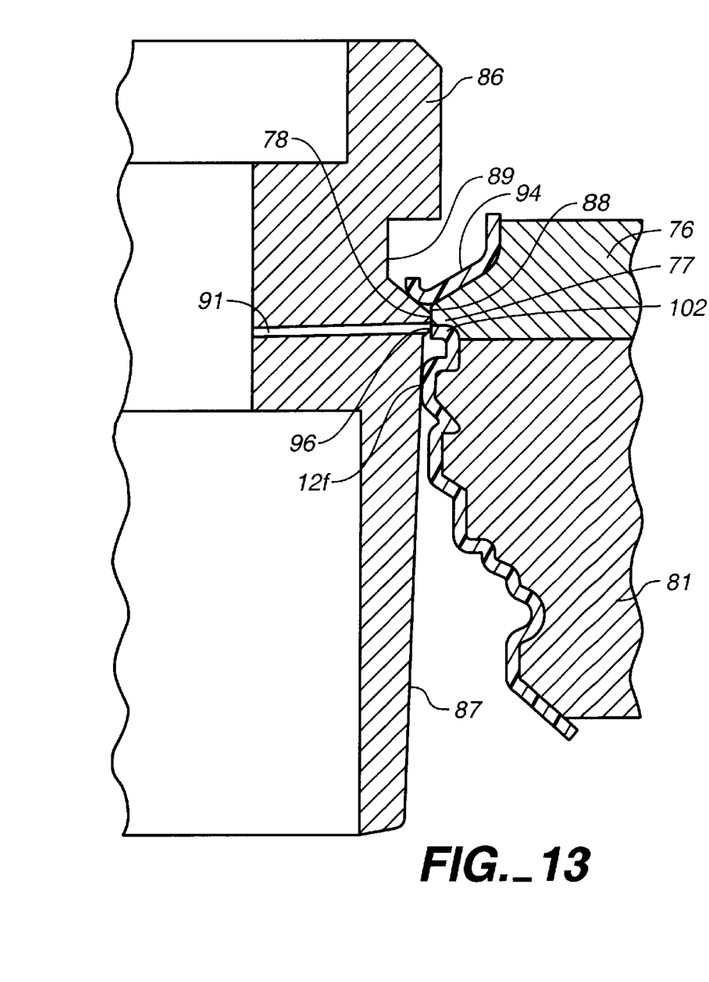
FIG. 13 is a view similar to FIG. 12, showing the blow pin in raised position.

As shown in FIGS. 12 and 13, another way to achieve the neck structure of the present invention is to employ what is commonly referred to as "pull-up" trim. In this case the cut line 38 is achieved by having a close diametrical fitting of a blow pin positioned internally within the parison and sets of shear steels mounted on the split mold. Diameters of the blow pin are typically 0.001 inch to 0.004 inch smaller than that diameter defined by the shear steels in closed position. After blowing of the neck and container, the portion of the parison above cut line 38 is severed from the neck portion below cut line 38 by upward movement of the blow pin relative to the shear steels.

It will be understood that the type plastic used to mold neck 11 may be any suitable relatively hard plastic such as polyethylene.

Figure 7:
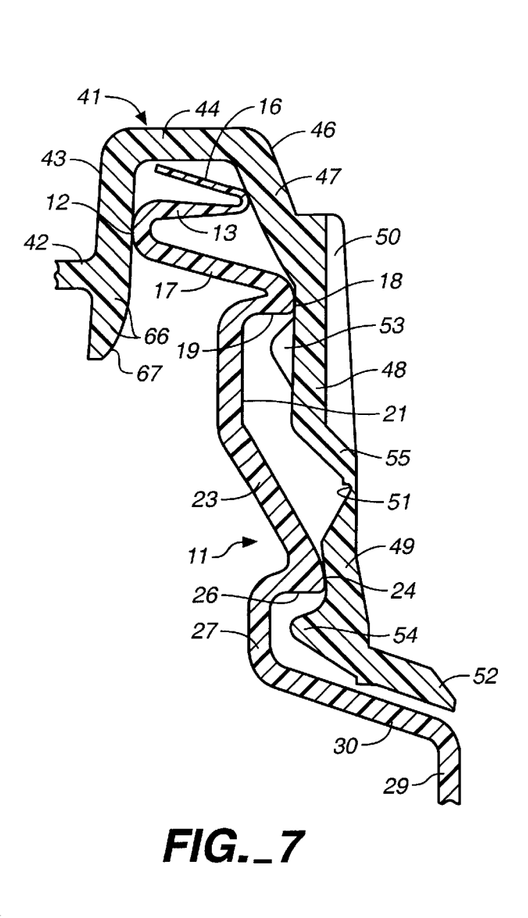
FIG. 7 is an enlarged sectional view showing schematically the seating of the cap on the neck.

One form of closure or cap used with the present invention is shown in FIGS. 3–7. The closure of FIGS. 3–7 comprises an indented circular top 42 having a short peripheral cylindrical upward extending member 43 from which extends outwardly a stack rim 44. The outer edge of rim 44 has a depending downward stretch 46 which merges into vertical, substantially cylindrical upper outer skirt 48. The lower end of skirt 48 merges into an outward-downward slanted stretch 55. Below stretch 55 is the lower substantially cylindrical outer skirt 49. An internal scoreline 51 separates stretch 55 from lower skirt 49. Below lower skirt 49 the cap has an outward-downward slanted flange 52 which, for practical purposes, rests against the surface 30 of neck 11. Interrupted upper inner bead sections 53 engage under the shoulder 19. Lower inner bead 54 at the lower end of skirt portion 49 engages under the shoulder 26. When the cap is attached, the beads 53 and 54 prevent cap 41 from being removed from neck 11. In order to enable the user to grip cap 41, ribs 50 extend outwardly from member 48 as best shown in FIG. 7. Ribs 50 also impart columnar strength to the closure to transfer vertical force and prevent closure collapse during axial application of the closure to the finish.

Figures 5, 6:
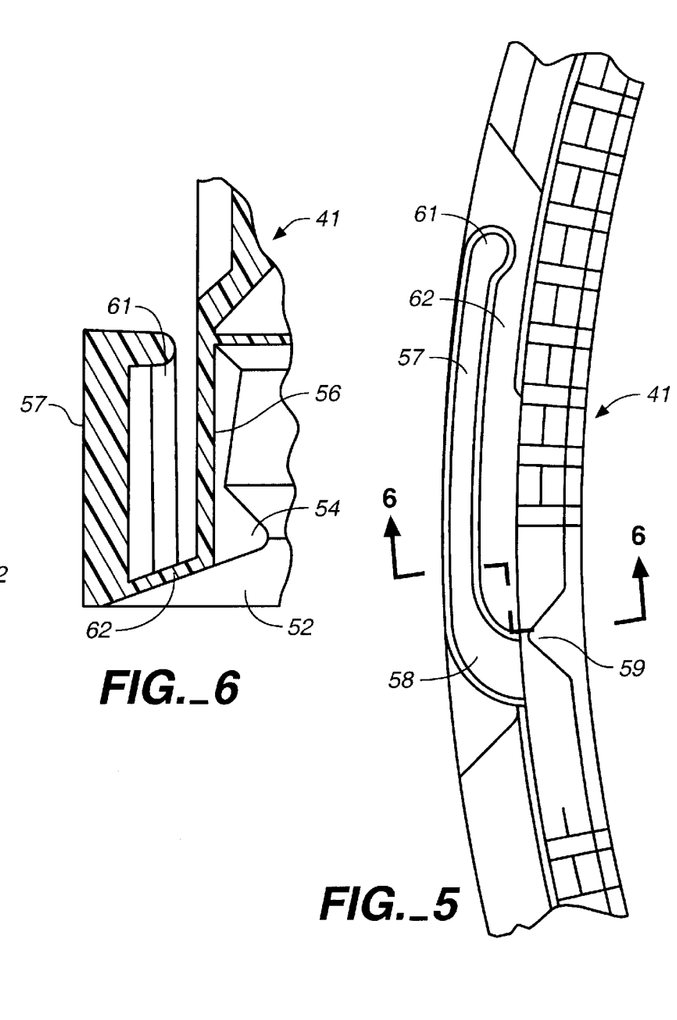
FIG. 5 is a further enlarged fragmentary bottom plan view of a portion of the cap showing a top view of the pull tab.
FIG. 6 is a fragmentary sectional view taken substantially along the line 6—6 of FIG. 5.

At one portion of the circumference of lower skirt 49 (as best shown in FIGS. 5 and 6), and spaced downwardly therefrom is a horizontal pull tab 57 having a curved connection 58 to skirt 49. The interior of skirt 49 is formed with a notch 59 where tab 57 joins lower skirt 49. Notch 59 forms a vertical line of weakness through skirt 49. Enlargement 61 is formed on the distal edge of pull tab 57. The flange 52 is formed thinner than the rest of flange 52 in the thin area 62 adjacent tab 57.

As a downward extension of cylindrical member 43 the cap 41 is formed with a depending skirt extension 66, the lower outer edge of which is formed with a radius 67. The inner surface of member 43 seals against primary seal surface 12. The vertical position of cap top 42 can be adjusted to provide for compression of surface 12 against the adjacent surface of member 43.

Directing attention to FIG. 7 it will be seen that the surface 12 is the primary sealing surface against the member 43. As has been noted, the surface 12 is very smooth and hence forms a very effective seal against the member 43.

When the cap is applied, the beads 53 and 54 lock under the shoulders 19 and 26 to prevent removal of the cap and hence are tamper evidencing. When the user wishes to open the container, the user grips the enlargement 61 and bends the pull tab 57 outwardly and then pulls circumferentially, tearing the lower skirt 49 from the upper cap portion. The user may then grip under the surface 55 which, as shown in FIG. 7, is spaced from the bottle finish by a considerable gap, and pull upwardly causing the interrupted upper bead segments 53 to disengage from shoulder 19 so that the cap may be removed. The ribs 50 rigidify the upper portion of the cap to allow the forces necessary to push the cap onto the bottle from causing the cap to buckle. The portion of the cap above line 51 constitutes a reclosure cap and may be pressed back on the neck after portions of the contents of the jar are dispensed as frequently as required.

Figure 8:
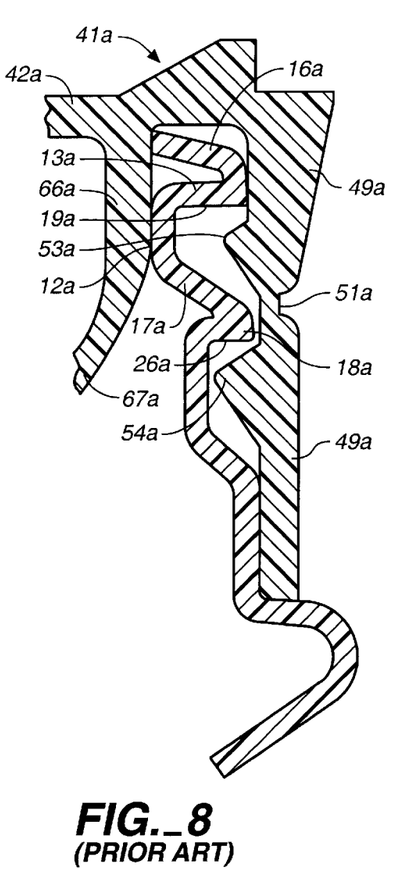
FIG. 8 is a view similar to FIG. 7 of a prior art device.

Comparison of FIG. 7 with prior art structure shown in FIG. 8 shows that in the present invention the very smooth surface 12 causes a tight seal against the member 43 and the flange 16 need not seal at all, whereas in the prior art the cut inner edge of the flange is a primary seal. The primary seal surface 12 has minimum deviation from ovality as compared to FIG. 8 where the primary seal is coincident with a trim surface. Bottles of the type of this invention and the prior art were molded. The ovality of the two types was measured. The unexpected result of these experiments was that the current invention produced a significantly more circular primary seal area. Refer to Table A. for tabulated results. The stretch occurring on both sides of the primary seal 12 is primarily contributing to the superior ovality and differentiate it from prior art.

TABLE A

| STD BOTTLE STYLE | | | | | | | |
| --- | --- | --- | --- | --- | --- | --- | --- |
| Run | | | | PRESENT INVENTION | | | |
| A | Run B | Run C | Run D | Run A | Run B | Run C | Run D |
| 0.055 | 0.020 | 0.048 | 0.028 | 0.024 | 0.058 | 0.002 | 0.015 |
| 0.053 | 0.002 | 0.056 | 0.015 | 0.006 | 0.010 | 0.106 | 0.030 |
| 0.062 | 0.000 | 0.044 | 0.010 | 0.017 | 0.002 | 0.013 | 0.010 |
| 0.043 | 0.010 | 0.058 | 0.003 | 0.016 | 0.004 | 0.005 | 0.027 |
| 0.058 | 0.029 | 0.025 | 0.009 | 0.014 | 0.013 | 0.005 | 0.034 |
| 0.064 | 0.016 | 0.055 | 0.003 | 0.011 | 0.060 | 0.017 | 0.017 |
| 0.011 | 0.005 | 0.059 | 0.002 | 0.004 | | 0.003 | 0.017 |
| 0.019 | 0.013 | 0.049 | 0.005 | 0.007 | | | |
| 0.042 | 0.006 | 0.045 | 0.002 | 0.013 | | | |
| Average 0.028 | | | | Average 0.016 | | | |

Figure 9:
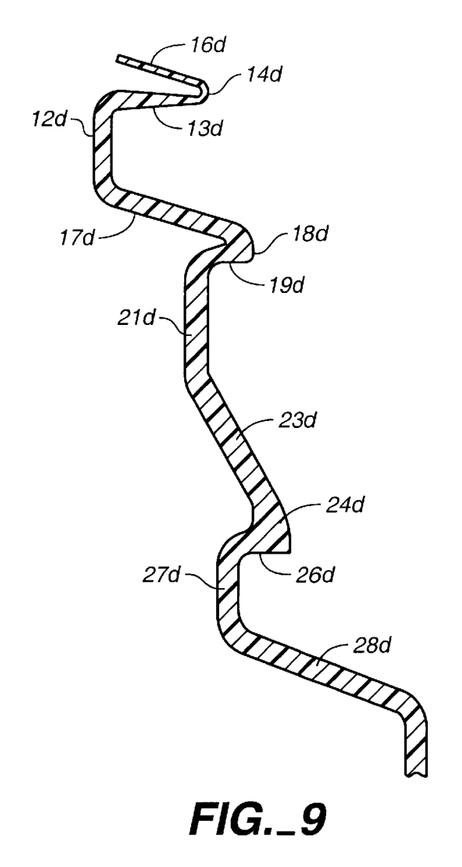
FIG. 9 is an enlarged view of the neck structure showing an alternate seal area.

FIG. 9 illustrates a shape wherein seal surface 12d is cylindrical rather than curved.

Figure 10:
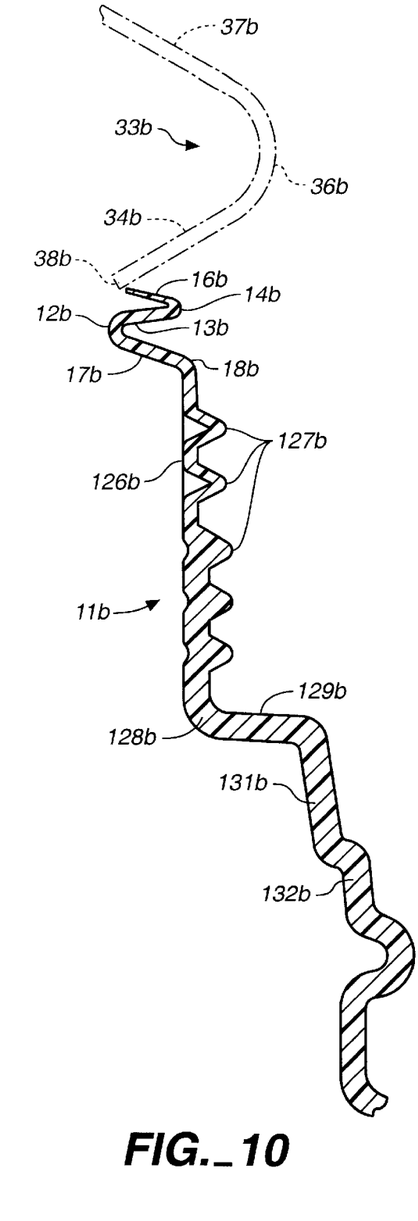
FIG. 10 is a view similar to FIG. 2 of a modification wherein screw threads are formed on the exterior of the neck.
Figure 11:
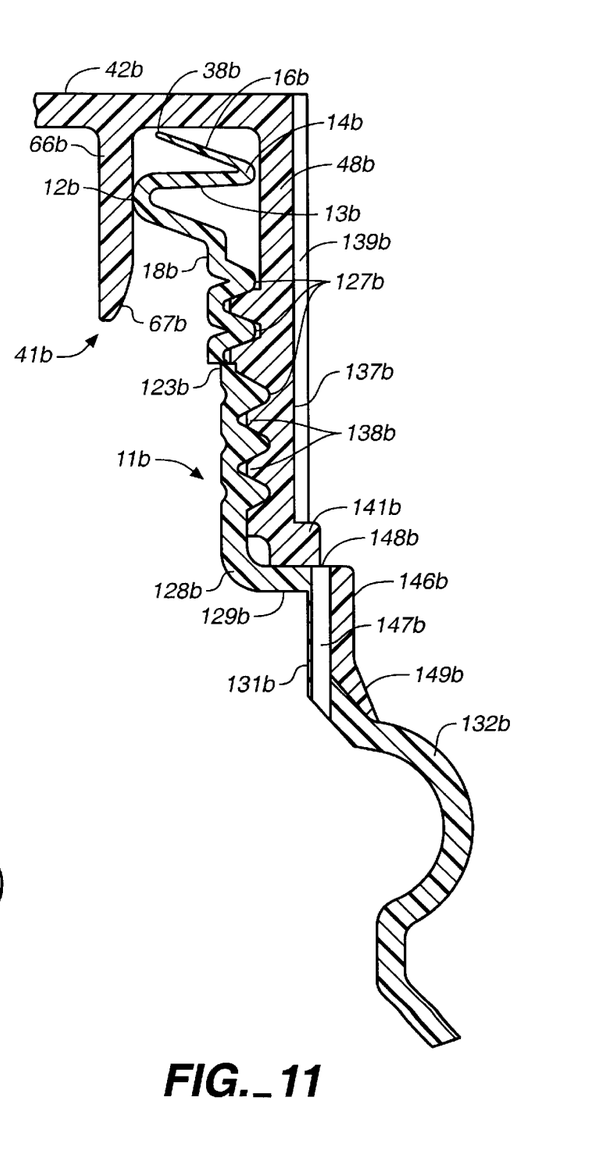
FIG. 11 is a view similar to FIG. 7 showing the neck of FIG. 10 with a cap applied thereto.

Directing attention to FIGS. 10 and 11, the neck finish 11b and the portion above the neck finish formed in the blow dome 33k resembles that of FIG. 2 except that screw threads 127b are formed on the exterior of upper neck surface 126k. Below threads 127b the neck has an outward curved portion 128k which merges with horizontal shoulder 129b against which shoulder 141k on the bottom edge of cap lower skirt 148b rests. Depending from shoulder 129b are lower ratchet teeth 131b and below teeth 131b is the remainder 132b of the neck 11b.

The vertical stretch 137b of cap 11b is formed with internal threads 138b which mesh with threads 127b. On the exterior of upper cap skirt 48b are vertical ribs 138b and on the lower end of stretch 137b is outward directed shoulder 141b from which depend ratchet teeth 146b which mesh with ratchet teeth 147b. Lower skirt 149b is joined to shoulder 141b at juncture 148b. Juncture 148b is frangible so that the lower skirt 146b and the internal ratchet teeth 146b thereof may be removed to permit the cap to be unscrewed from the neck. Fracture of juncture 148b indicates tampering with the contents of the container. Below lower skirt 146b is a downward-outward directed flange 149b which is in close proximity to the remainder 132b of the neck so as to prevent foreign matter from entering between the ratchet teeth.

Directing attention to the modification shown in FIGS. 12 and 13, formation of a modified container neck is shown. Such a neck may resemble that shown in FIGS. 1 and 2 of U.S. Pat. No. 4,699,287, with an important modification, as hereinafter explained. In FIG. 12 the parison forming the neck is shown between a blow pin 86 and shear steel 76 and neck insert 21 as molding is being completed.

Shear steel 76 has an inward projection 77 terminating in a vertical inward extending shearing edge 78. Blow pin 86 has a lower portion 87 having an outward extending shearing edge 88 with a groove 89 thereabove.

As shown in FIG. 12, blow molding of the parison to the shape of shear steel 76 and neck insert 81 has just been completed. The shape of the parison generally resembles the neck shown in said U.S. Pat. No. 4,699,287. Edge 88 is located below edge 78. Air blowing through hole 91 has formed vertical stretch 101 and flange 102. The smooth, vertical, lower cylindrical portion 87 has formed internal primary seal surface 12f.

The blow pin 86 then moves from the position of FIG. 12 to the position of FIG. 13 The neck structure is sheared between edges 78 and 88. Flange inner edge 96 is formed where the edges 78, 88 have sheared the same and the parison sheared-off portion 94 thereabove is discarded.

It is noted that edge 96 is of a larger diameter than primary seal surface 12f. hence the hollow plug or inner skirt such as that shown in U.S. Pat. No. 4,699,287 seated on the container neck seals against surface 12f instead of surface 96. Since blow pin 86 has no parting line, surface 12f has no flash. Surface 12f is smooth and its diameter is always the same during repetitive molds and hence makes a superior seal with the cap plug.

Figure 14:
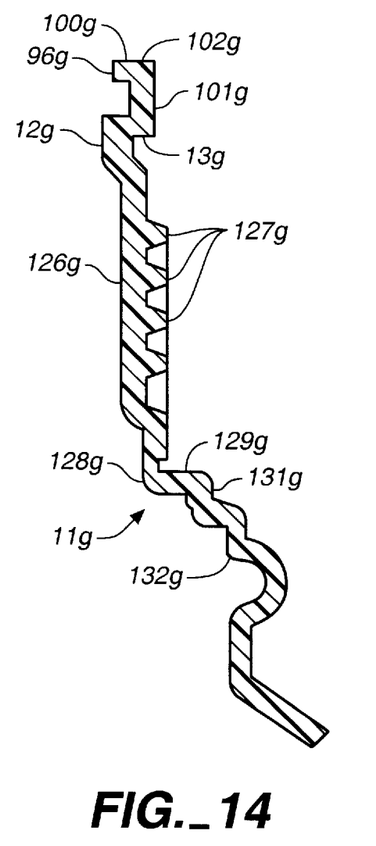
FIG. 14 is a fragmentary vertical sectional view through a portion of a neck similar to that of FIG. 13 with the snap-on features replaced by screw threads.
Figure 15:
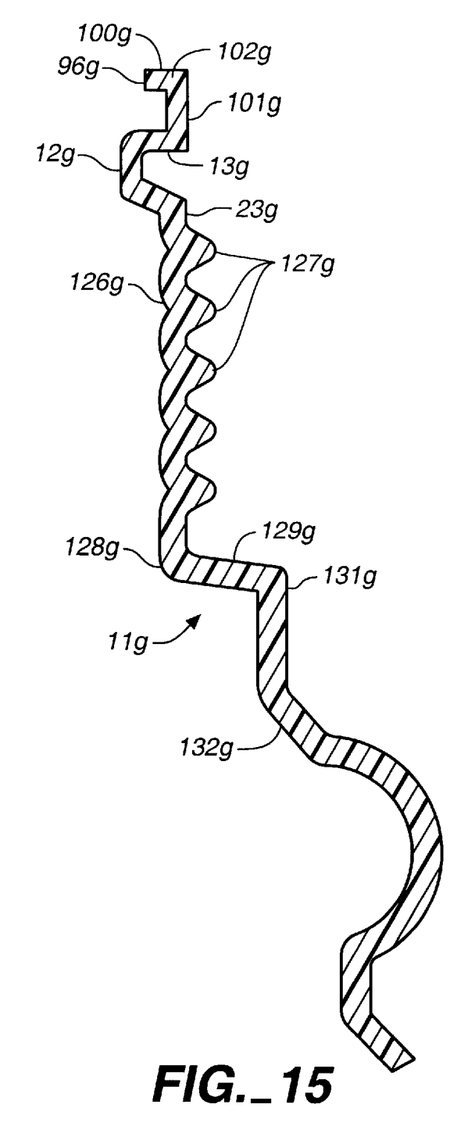
FIG. 15 is an enlarged view of the structure of FIG. 14.

FIGS. 14 and 15 illustrate a neck finish 11g similar to that shown in FIG. 13 modified in that external screw threads 127g are formed on the neck structure to replace the snap-on structure shown in FIG. 13. FIG. 15 is an enlarged view of a portion of FIG. 14 showing the positioning of ratchet teeth 121g which are interengaged by internal ratchet teeth on the lower portion of a cap skirt similar to that shown in FIG. 11.

Figure 16:
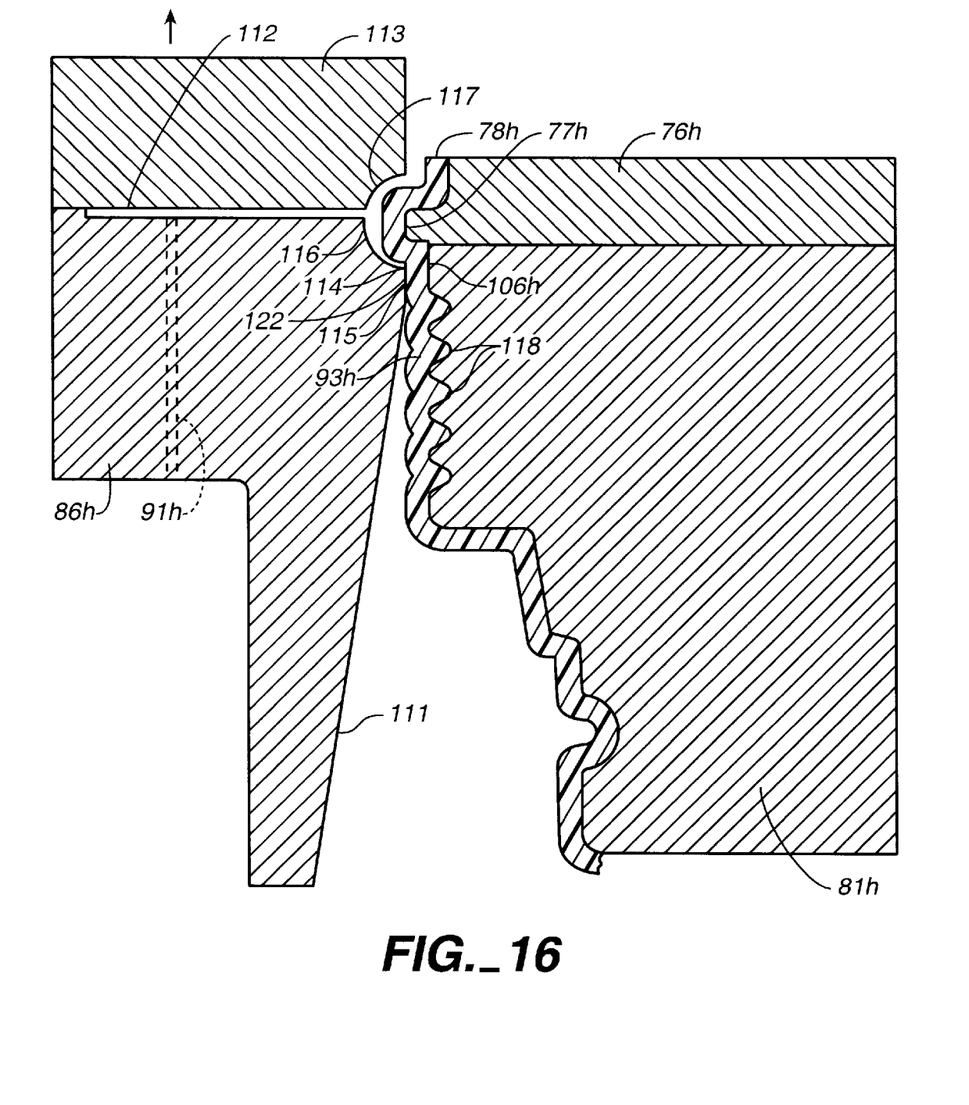
FIG. 16 is a fragmentary sectional view of a further modified mold, blow pin and parison.

Directing attention now to FIG. 16, a different shape neck is produced by the mold parts therein illustrated. Blow pin 86h has a lower tapered portion 111 at the upper end of which is a vertical cylindrical surface 115 which is smooth and terminates at its upper end in a shear corner 114. Above corner 114 is a cut-away 116. Blow pin 86h may be made of two parts in order to facilitate fabrication. As shown in FIG. 16 the lower portion 86h is attached to upper blow pin 116 and radial grooves or channels 112 are cut in the top surface of 86h, being connected to vertical air holes 91h. Thus when air is blown into the blow pin 86h air travels up holes 91g and out channels 112. The lower corner of upper blow pin 113 is formed with a cut-away 117 which merges with cut-away 116 to clear the inward shearing edge 78h of inward extension 77h of shear steel 76h. The upper end of neck insert 81h is formed with seal forming projection 106h which presses the parison against surface 115. The neck formed in neck insert 81h has external threads and hence grooves 118 for such threads are formed therein. Below the threaded portion of the neck, the bottle may assume any desired shape and hence the details of the neck insert 81h which form the same are not specifically set forth.

After the neck has been blown, as shown in FIG. 16, the blow pin 86h is raised and hence the shear corner 114 shears off the parison by shearing action against edge 78h. Thus the neck has a straight upward section 122 which is a smooth sealing surface characterized by the absence of mold parting lines and also characterized by the absence of rough edges.

Figure 17:
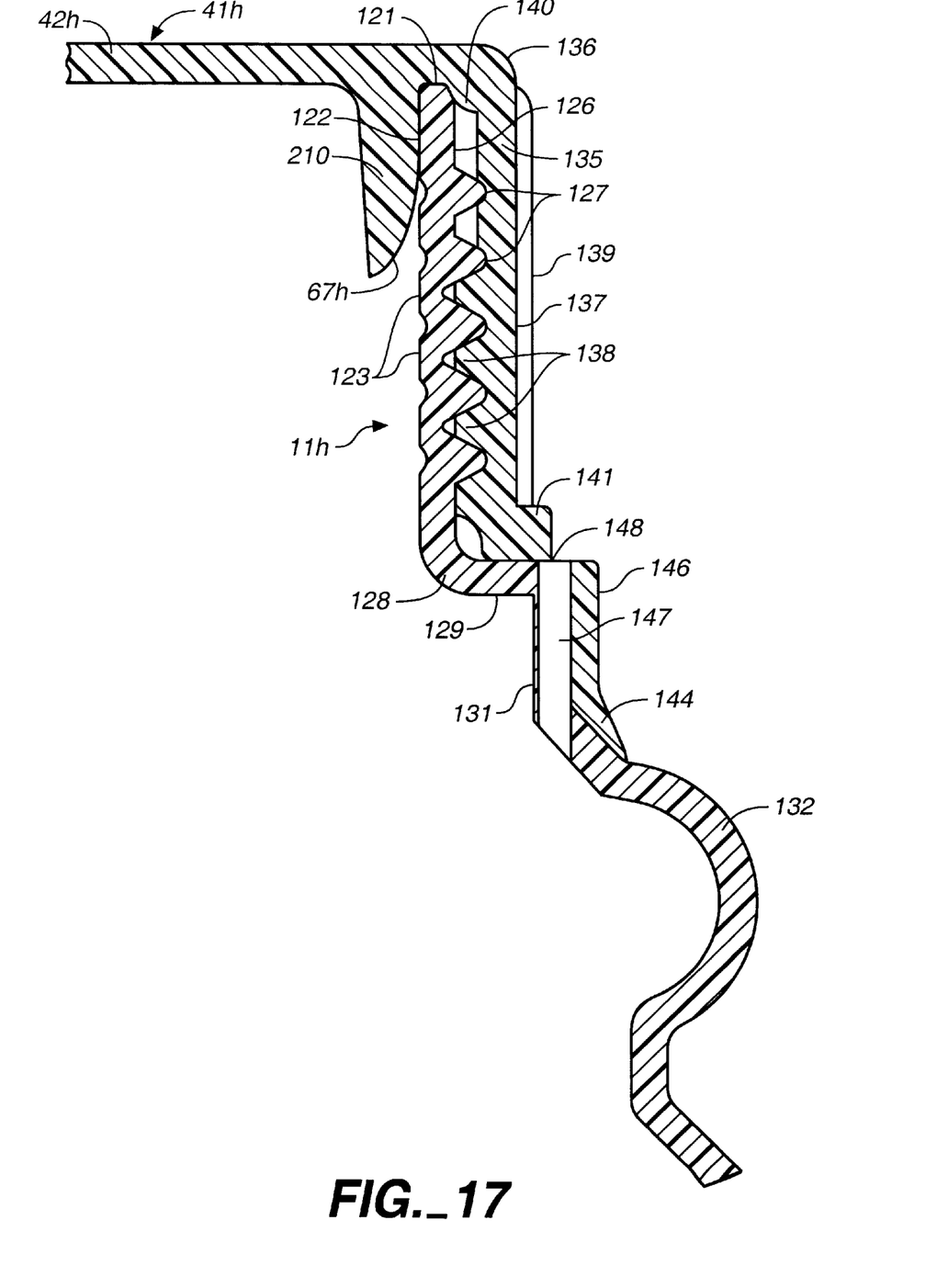
FIG. 17 is a fragmentary sectional view of a neck formed in accordance with FIG. 16 and a cap seated thereon.

Directing attention to FIG. 17, the neck 11h formed in the mold parts shown in FIG. 16 is illustrated with a cap 41h snapped thereon. Thus neck 11h has an upper lip 121 below which is a vertical, smooth, seamless seal surface 122. On the outside of the neck 11h there is an upper, vertical, straight surface 126 below which are external threads 127. Below the threads is an outward curved portion 128 which merges with an horizontal shoulder 129. Below the shoulder 129 are outward extending vertical ratchet teeth 131, and below the teeth 131 is the remainder of the neck 132.

Cap 41h has a top 42h with a vertical outer skirt 135 depending from the outer edge thereof. Upper skirt 135 is connected to lower skirt 146 as hereinafter appears. The upper edge of skirt 135 is connected to top 42h by corner 136, and below corner 136 is a substantially vertical stretch 137, the inner surface of which is formed with internal threads 138 which mate with the external threads 127 of neck 11h. On the exterior of upper skirt 135 are vertical ribs 139 which assist the user in unscrewing the cap. An inner projection from the interior of the cap skirt wall shown in the embodiment of FIG. 17 as filet 140 is provided. The purpose of filet 14o is to increase the compressive force between the seal surface 122 and plug 210. The inner surface of lower skirt 146 is formed with ratchet teeth 147 which mate with the teeth 131. The upper inner corners of teeth 147 are joined to shoulder 141 on the lower end of upper skirt 135 at frangible juncture points 148. Below lower skirt 146 is an outward, downward slanted flange 144 which engages the outside of skirt portion 132.

Depending from top 42h is a plug or inner skirt 210 having a radius 67h at its lower, outer corner. Compression of the neck surface between plug 210 and projection 140 forms a liquid tight seal.

It will be seen that the cap shown in FIG. 17 is tamper-evidencing. When the cap 41h is unscrewed, the junctures 148 fracture, permitting the cap to be unscrewed but so long as the junctures 148 are intact, evidence that the cap has not been opened appears.

Figure 18:
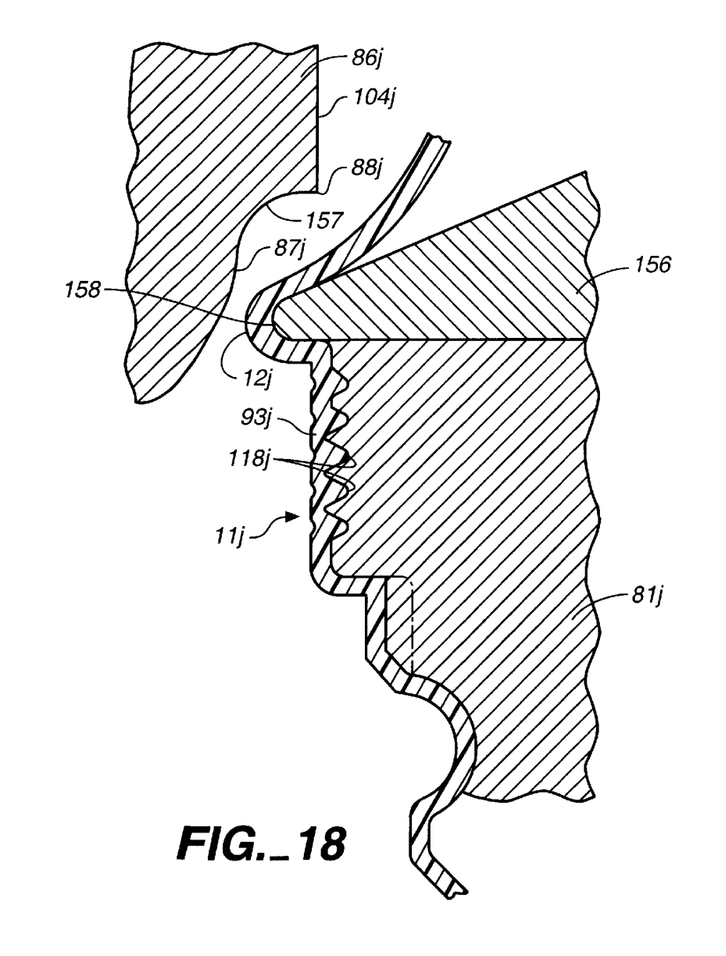
FIG. 18 is a view similar to FIG. 16 of another modified mold, blow pin and parison showing the blow pin in raised position.
Figure 19:
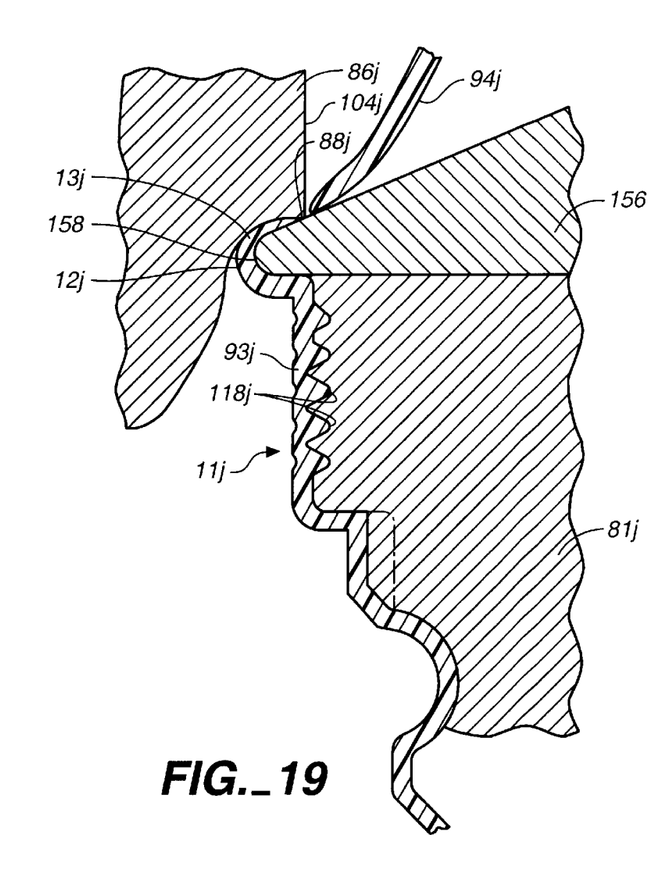
FIG. 19 is a view similar to FIG. 18 showing the blow pin in lowered position.

Directing attention to FIGS. 18–19 a neck similar to that of FIG. 17 is produced. The molding process used is generally known as "ram down" molding in that the blow pin 86j is forced down on striker plate 156. Blow pin 86j has an upper cylindrical portion 104j, a reduced diameter portion 87j below portion 104j, and a curved portion 157 intermediate portions 87j and 104j. A corner 88j at the juncture of curved portion 157 and upper portion 104j comprises a cutting edge. Neck insert 81j resembles that of FIG. 16. Above neck insert 81j is a striker plate 156 having a rounded point 158 which is opposite curved portion 157 when blow pin 86j is in down position (FIG. 19). The spacing between point 158 and curved portion 157 is slightly less than the thickness of parison 93j. As shown in FIG. 19, when pin 81j is in down position, cutting edge 88j engages striker plate point 158 thereby cutting off parison portion 94j. The parison 93j is squeezed between point 158 and curved portion 157, thereby creating primary seal surface 12j.

Figure 20:
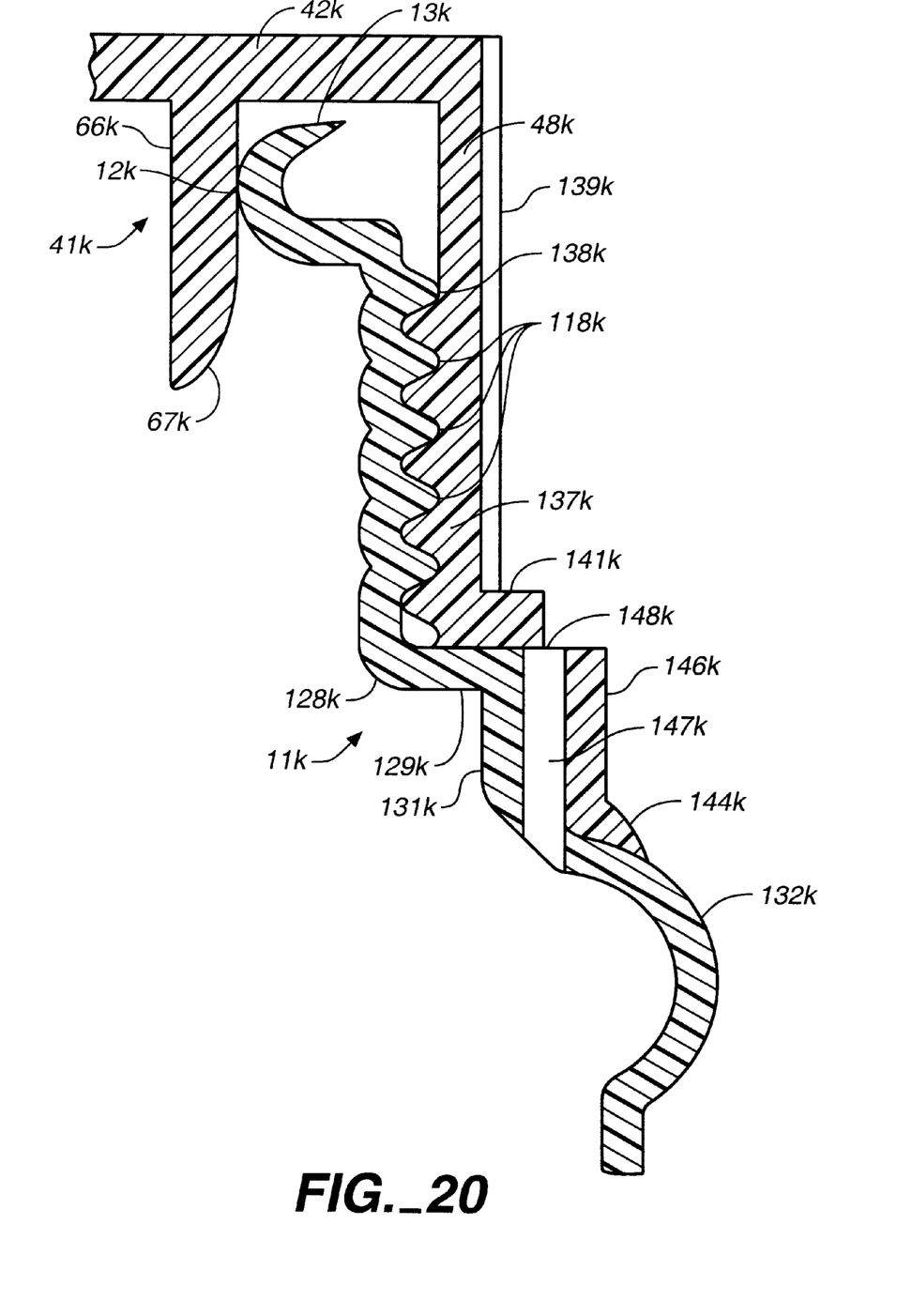
FIG. 20 is a view similar to FIG. 7 showing a neck similar to FIG. 19 with a cap seated thereon.

FIG. 20 shows the neck structure 11k of FIG. 19 with a cap 41k seated thereon.

It will be understood that different neck shapes are shown formed by the various types of molds and molding methods illustrated in the drawings and described herein. However the neck shapes and molding techniques may be interchangeable, as will occur to one skilled in the art.

In FIGS. 8, 9, 10–11, 12–13, 14–15, 16–17, 18–19 and 20 the same reference numerals are used for parts corresponding to those elsewhere mentioned followed by subscripts a, d, b, f, g, h, j, and k respectively.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use con- templated. It is intended that the scope of the invention be defined by the claims appended hereto and their equivalents.

What is claimed is:

1. In combination, a neck for a blow molded plastic container and a cap, said cap having a top, an outer skirt depending from said top, a plug substantially vertically depending from said top, said plug being located inward of said outer skirt with an annular gap between said outer skirt and said plug, and neck engaging means on said outer skirt, said neck comprising a sealing portion having a smooth, internal primary seal surface characterized by the absence of mold parting lines sealingly engaging said plug, an outward bend above said sealing portion, an outward extending stretch joined to said outward bend, an upward stretch above said outward extending stretch, an inward bend above said upward stretch, and an inwardly extending flange joined to said inward bend, said flange terminating in a trim line spaced outward of said plug, a second portion below said seal surface, and at least one external cap engaging means on said second portion, said neck engaging means and said external cap engaging means comprising inter-engaging screw threads.

2. The combination of claim 1 in which said cap further comprises a lower tamper evidencing skirt stretch below said outer skirt joined to said outer skirt along a circumferential line of weakness.

3. The combination of claim 2 in which said tamper-evidencing skirt stretch is formed with internal teeth and in which said second portion of said neck is provided with external teeth below said cap engaging means meshing with said internal teeth.

4. The combination of claim 1 in which said neck engaging means is located entirely below the level of said seal surface.

5. In combination, a neck for a blow molded plastic container and a cap, said cap having a top, an outer skirt depending from said top and a plug substantially vertically depending from said top, said plug being located inward of said outer skirt with an annular gap between said outer skirt and said plug and internal neck engaging means on said outer skirt, said neck comprising a first portion having a smooth, internal substantially vertical primary seal surface characterized by the absence of mold parting lines sealingly engaging said plug, an outward bend above said first portion, an outward, substantially horizontal stretch joined to said outward bend, an upward bend at an outer end of said horizontal stretch, an upward, substantially vertical stretch above said upward bend, an upward-inward curved stretch at an upper end of said vertical stretch, a substantially vertical terminus at an inner end of said upward-inward curved stretch, said vertical terminus having a greater diameter than said first portion, said terminus being spaced outward from said plug and not sealing against said plug, a second outward-downward extending portion below said seal surface and at least one external cap engaging means on said second portion, said neck engaging means and said external cap engaging means comprising inter-engaging screw threads.

6. The combination of claim 5 in which said cap further comprises a lower tamper-evidencing skirt stretch below said outer skirt joined to said outer skirt along a circumferential line of weakness.

7. The combination of claim 6 in which said tamper-evidencing skirt stretch is formed with internal teeth and in which said second portion of said neck is provided with external teeth below said cap engaging means meshing with said internal teeth.

8. In combination, a neck for a blow molded plastic container and a cap, said cap having a top, an outer skirt depending from said top, an inner projection at the juncture of an underside of said top and an inner surface of said outer skirt, and a plug substantially vertically depending from said top, said plug being located inward of said outer skirt with an annular gap between said outer skirt and said plug, and internal neck-engaging means on said outer skirt, said neck comprising a first portion having a sealing surface having a smooth, internal primary seal surface characterized by the absence of mold parting lines sealingly engaging said plug, said first portion and said seal surface extending substantially vertically upward to a substantially horizontal terminus, said projection biasing said sealing surface into tight engagement with said plug, said sealing surface and said first portion having a substantially constant inner diameter, a second portion extending downward below said first portion and at least one external cap engaging means on said second portion, said neck engaging means and said external cap engaging means comprising inter-engaging screw threads.

9. The combination of claim 8 in which said cap further comprises a lower tamper-evidencing skirt stretch below said outer skirt joined to said outer skirt along a circumferential line of weakness.

10. The combination of claim 9 in which said tamper-evidencing skirt stretch is formed with internal teeth and in which said second portion of said neck is provided with external teeth below said cap engaging means meshing with said internal teeth.

11. In combination, a neck for a blow molded plastic container and a cap, said cap having a top, an outer skirt depending from said top and a plug substantially vertically depending from said top, said plug being located inward of said outer skirt with an annular gap between said outer skirt and said plug, and internal neck engaging means on said outer skirt, said neck comprising a first portion comprising a sealing portion having a smooth, internal primary seal surface characterized by the absence of mold parting lines sealingly engaging said plug, said first portion further curving upward-outwardly and tapering distally to a terminus spaced upward and outward of said seal surface, a second portion extending outward-downward below said seal surface and at least one external cap engaging means on said second portion, said neck engaging means and said external cap engaging means comprising inter-engaging screw threads.

12. The combination of claim 11 in which said cap further comprises a lower tamper-evidencing skirt stretch below said outer skirt joined to said outer skirt along a circumferential line of weakness, said lower outer skirt being formed with internal ratchet teeth and in which said second portion of said neck is further provided with external ratchet teeth below said cap engaging means.

13. The combination of claim 12 in which said tamper-evidencing skirt stretch is formed with internal teeth and in which said second portion of said neck is provided with external teeth below said cap engaging means meshing with said internal teeth.

14. A method of forming a container neck structure for a thin walled, blow-molded plastic container having a sealing portion having a smooth internal primary seal surface, an upward extending portion above said seal portion, a downward-outward extending lower portion below said seal portion, and at least one external cap engaging means, said cap engaging means comprising external screw threads, said method comprising providing a split mold conforming to the exterior of said container, placing a plastic parison within said mold, blowing air into said parison through a blow pin to expand said parison to fill said mold with thin-walled plastic, forming said seal surface smooth and free of parting lines caused by said mold components, and trimming said upward-extending portion at a circumferential trim line having a circumference no smaller than that of said seal surface, said mold being provided with a blow dome area above said neck and in which said step of blowing air through said blow pin expands a portion of said parison into said blow dome area to form a blow dome and in which said step of trimming comprises cutting said blow dome along a circle of greater diameter than the diameter of said seal surface, said mold being shaped so that said step of blowing air into said parison forms an outward-upward stretch above said seal surface, an upward bend joined to said outward-upward stretch, an inward bend and an inward stretch above said inward bend, said inward stretch being cut off from said blow dome during said trimming step, said step of blowing air through said blow pin further forming said external screw threads.

15. The method of claim 14 in which said step of blowing air through said blow pin forms a tamper-evidencing means stretch below said screw threads.

16. A method of forming a container neck structure for a thin walled, blow-molded plastic container having a sealing portion having a smooth internal primary seal surface, an upward extending portion above said seal portion, a downward-outward extending lower portion below said seal portion, and at least one external cap engaging means said cap engaging means comprising external screw threads comprising providing a split mold conforming to the exterior of said container, providing a blow pin having a cylindrical portion opposite said primary seal surface and having an external shearing surface larger than said cylindrical portion and a shear steel in said mold above said primary seal surface having an internal shearing surface, placing a plastic parison within said mold, blowing air into said parison through said blow pin to expand said parison to fill said mold with thin-walled plastic, said step of blowing air further forming said external screw threads, forming said seal surface smooth and free of parting lines caused by said mold components, and trimming said upward-extending portion at a circumferential trim line having a circumference no smaller than that of said seal surface, said step of trimming comprising moving said blow pin upward relative to said shear steel, said external and internal shearing surfaces cooperating to shear said parison above said primary seal surface, said mold being shaped to form in said parison above said primary seal surface ar outward extending stretch, a vertically extending stretch above said outward extending stretch and an inward extending flange joined to said vertically extending stretch, said step of moving said blow pin shearing said inward flange.

17. A method according to claim 16 in which the inner diameter of said inward flange is greater than the inner diameter of said primary seal surface.

18. A method according to claim 16 in which said step of blowing air further comprises forming a tamper-evidencing means below said cap engaging means.

19. The method of claim 18 in which said step of blowing air through said blow pin forms teeth on said tamper-evidencing means.

20. A method of forming a container neck structure for a thin walled, blow-molded plastic container having a sealing portion having a smooth internal primary seal surface, an upward extending portion above said seal portion, a downward-outward extending lower portion below said seal portion, and at least one external cap engaging means said cap engaging means comprising external screw threads comprising providing a split mold conforming to the exterior of said container, said mold being formed with a pointed striker plate, a blow pin having a first diameter portion, a second diameter portion larger than and above said first diameter portion and a curved intermediate portion between said first and second portions, the juncture of said intermediate portion and said second diameter portion comprising a cutting edge, placing a plastic parison within said mold, closing said mold, trimming said upward-extending portion at a circumferential trim line having a circumference no smaller than that of said seal surface, said step of trimming comprising ramming said pin downward whereby said cutting edge shears said parison against said striker plate, blowing air into said parison through said blow pin to expand said parison to fill said mold with thin-walled plastic, said step of blowing air further forming said external screw threads, and forming said seal surface smooth and free of parting lines caused by said mold components.

21. A method according to claim 20 in which said lower portion further comprises external teeth below said cap engaging means and said step of blowing air through said blow pin further forms said teeth.

22. A method according to claim 20 in which said lower portion further comprises tamper-evidencing means below said cap engaging means.

23. The method of claim 22 in which said step of blowing air through said blow pin forms teeth on said tamper-evidencing means.

* * * * *